(12) United States Patent
Moritomo

(10) Patent No.: US 12,335,825 B2
(45) Date of Patent: Jun. 17, 2025

(54) COMMUNICATION APPARATUS, INFORMATION PROCESSING APPARATUS, DELIVERY SYSTEM, AND CONTROL METHODS AND STORAGE MEDIUM

(71) Applicant: CANON KABUSHIKI KAISHA, Tokyo (JP)

(72) Inventor: Kazuo Moritomo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 390 days.

(21) Appl. No.: 17/864,706

(22) Filed: Jul. 14, 2022

(65) Prior Publication Data

US 2023/0072416 A1    Mar. 9, 2023

(30) Foreign Application Priority Data

Sep. 3, 2021   (JP) ................. 2021-144168

(51) Int. Cl.
*H04W 4/44*     (2018.01)
*G08G 1/0967*   (2006.01)
*H04W 4/12*     (2009.01)

(52) U.S. Cl.
CPC ........ *H04W 4/44* (2018.02); *G08G 1/096716* (2013.01); *G08G 1/096775* (2013.01); *H04W 4/12* (2013.01)

(58) Field of Classification Search
CPC ........... H04W 4/12; H04W 4/44; H04W 4/46; H04W 4/48; H04W 4/60; G08G 1/096716; G08G 1/096775
USPC .................................................... 455/456.3
See application file for complete search history.

(56) References Cited

U.S. PATENT DOCUMENTS

| | | | | |
|---|---|---|---|---|
| 8,477,014 | B2 * | 7/2013 | Shionozaki | H04W 64/003 340/8.1 |
| 9,168,882 | B1 * | 10/2015 | Mirza | B60R 16/037 |
| 9,417,312 | B2 * | 8/2016 | Velusamy | G01S 19/03 |
| 9,998,993 | B2 | 6/2018 | Moritomo | |
| 11,079,241 | B2 * | 8/2021 | Yang | H04W 4/46 |
| 2009/0322560 | A1 | 12/2009 | Tengler et al. | |
| 2011/0143719 | A1 * | 6/2011 | Jung | G07C 5/008 455/414.1 |
| 2014/0204925 | A1 * | 7/2014 | Otomo | H04W 68/12 370/338 |

(Continued)

FOREIGN PATENT DOCUMENTS

WO    2018/100661 A1    6/2018

OTHER PUBLICATIONS

Extended European Search Report issued in corresponding EP Patent Application No. 22184886.4, dated Nov. 28, 2022, pp. 1-11.

*Primary Examiner* — Jean A Gelin

(74) *Attorney, Agent, or Firm* — Carter, DeLuca & Farrell LLP

(57) ABSTRACT

A communication apparatus notifies an external device of position information, receives an identifier notified from the external device after notifying the position information, stores, after the identifier is received, the received identifier as management information for specifying a message that the communication apparatus is to subscribe to, and obtains, in a case where a message delivered from outside and associated with the identifier stored as the management information is received, information included in the received message.

3 Claims, 11 Drawing Sheets

(56) References Cited

U.S. PATENT DOCUMENTS

| | | | |
|---|---|---|---|
| 2015/0018016 A1* | 1/2015 | Zhang | H04W 64/00 455/456.3 |
| 2015/0199903 A1* | 7/2015 | Cuomo | H04W 4/021 340/905 |
| 2015/0288636 A1* | 10/2015 | Yalavarty | H04L 51/216 709/206 |
| 2016/0358467 A1* | 12/2016 | Jeong | G08G 1/0133 |
| 2017/0188238 A1* | 6/2017 | Nagamatsu | H04W 12/08 |
| 2018/0167283 A1 | 6/2018 | Moritomo | |
| 2018/0192139 A1* | 7/2018 | Deshpande | H04N 21/6125 |
| 2018/0319351 A1* | 11/2018 | Okuda | B60R 11/04 |
| 2019/0146484 A1* | 5/2019 | Lin | G07C 5/008 701/2 |
| 2019/0173951 A1 | 6/2019 | Sumcad et al. | |
| 2020/0132501 A1* | 4/2020 | Czarnecki | H04W 4/021 |
| 2020/0260239 A1 | 8/2020 | Ahn et al. | |
| 2021/0258831 A1* | 8/2021 | Belling | H04L 47/2441 |
| 2022/0321693 A1* | 10/2022 | Rumland | H04M 1/72418 |
| 2022/0415508 A1* | 12/2022 | Hatakeyama | G01N 33/0098 |
| 2023/0168674 A1* | 6/2023 | Joseph | G01C 21/3492 701/25 |

* cited by examiner

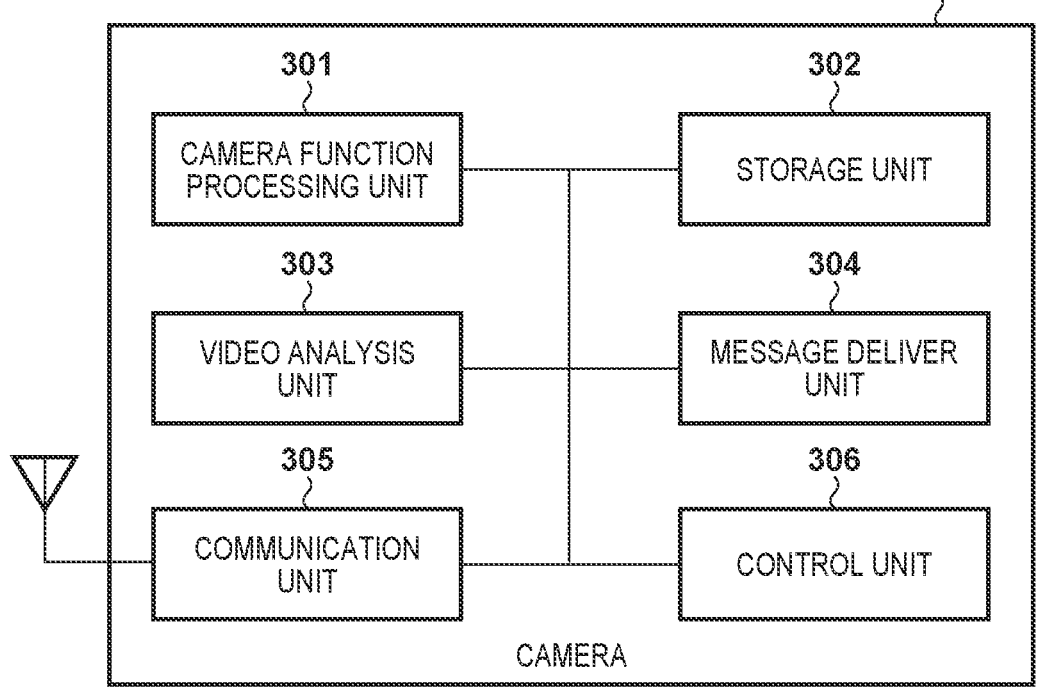
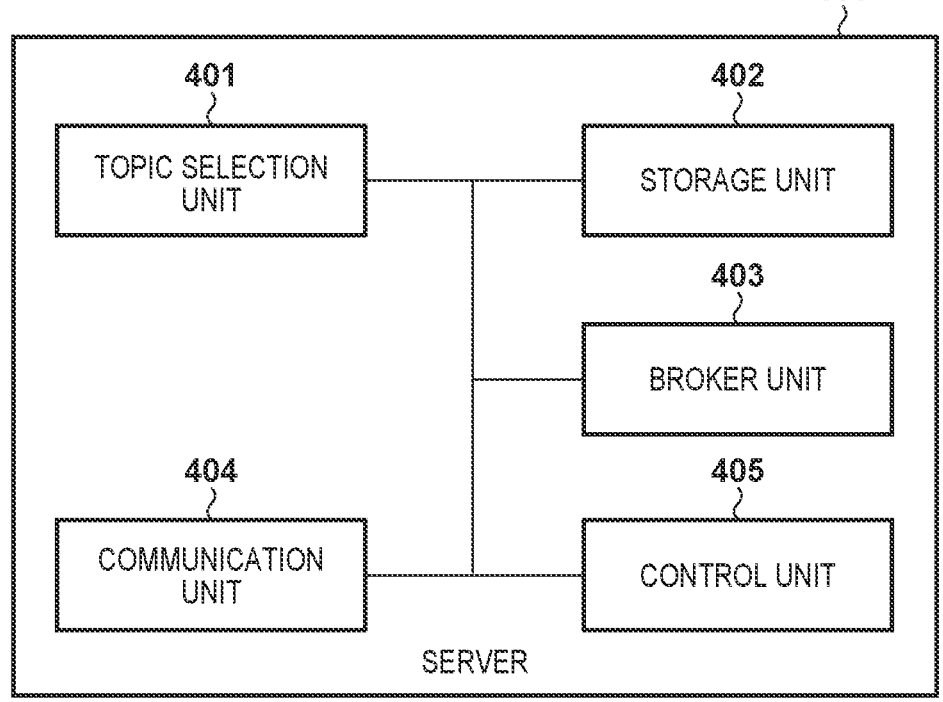

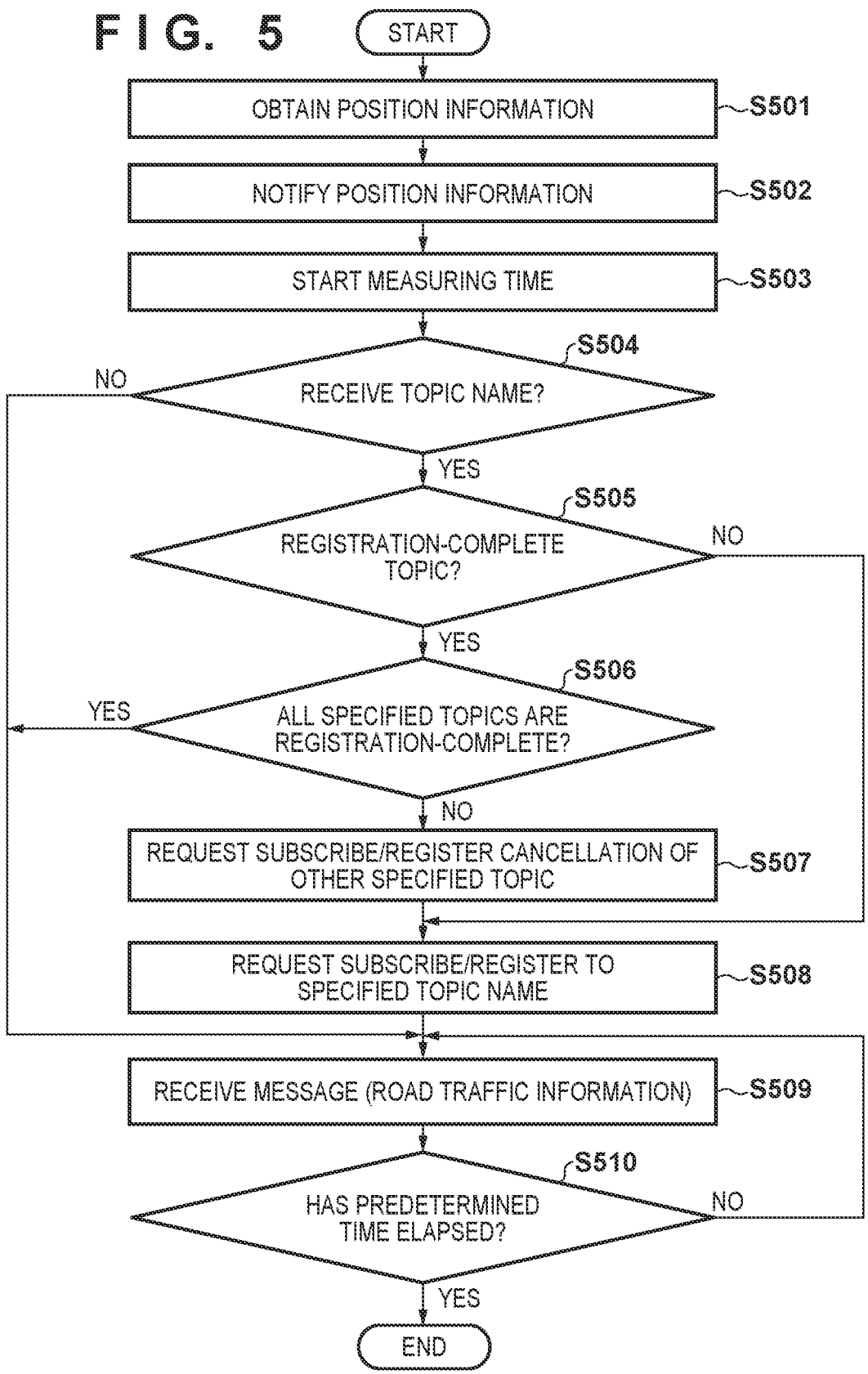

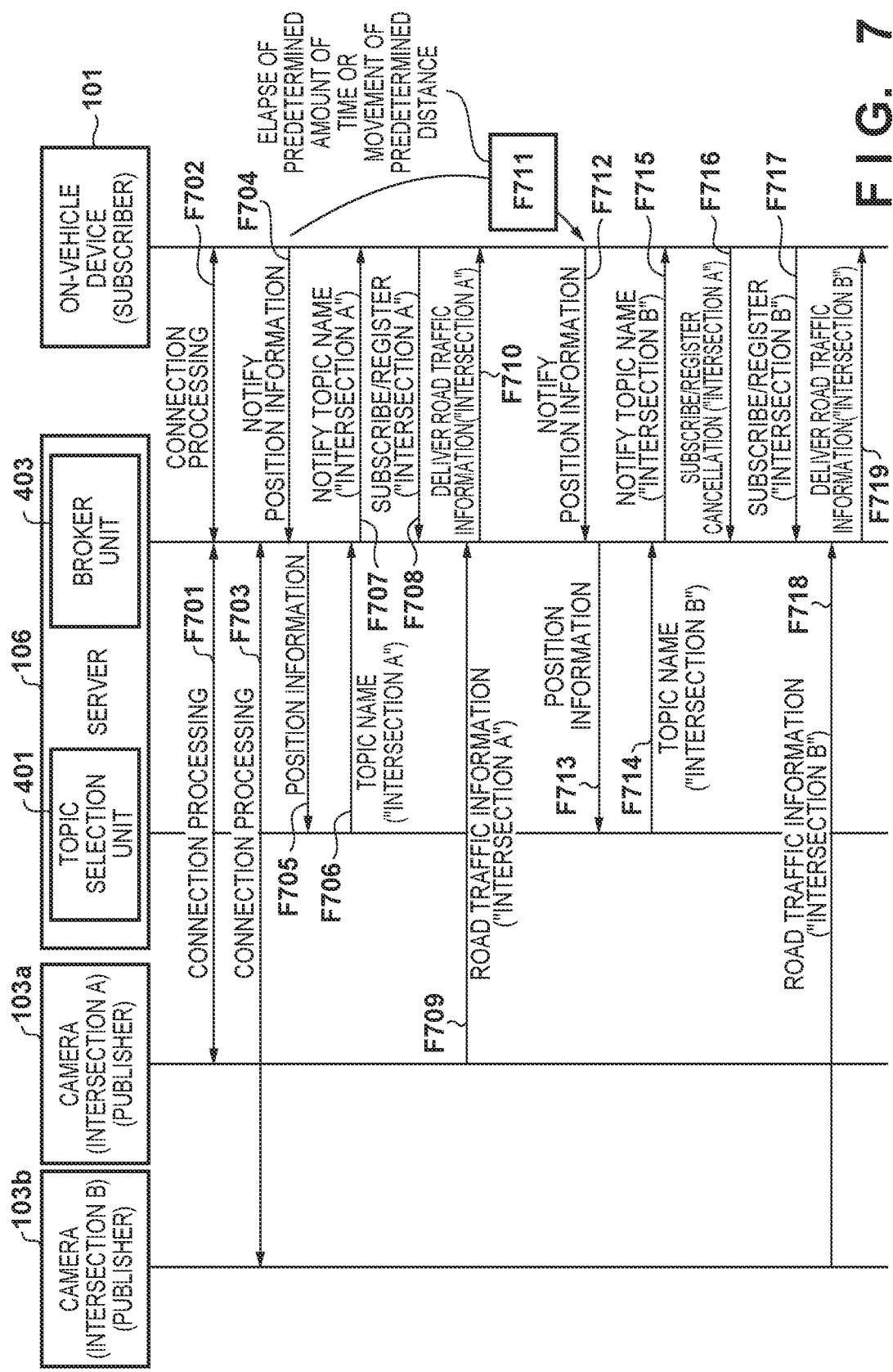

FIG. 8A

| ORDER | Publish |
|---|---|
| 1 | MESSAGE TYPE |
| 2 | MESSAGE LENGTH |
| 3 | TOPIC LENGTH |
| 4 | TOPIC NAME |
| 5 | MESSAGE |

FIG. 8B

| ORDER | Subscribe/Unsubscribe |
|---|---|
| 1 | MESSAGE TYPE |
| 2 | MESSAGE LENGTH |
| 3 | TOPIC LENGTH |
| 4 | TOPIC NAME |

FIG. 9

| TOPIC NAME | DELIVERY AREA |
|---|---|
| Intersection_00A | TARGET POSITION INFORMATION<br>  –LATITUDE: aaa, LONGITUDE bbb<br>DELIVERY AREA INFORMATION<br>  –CENTERED ON TARGET POSITION<br>    INFORMATION RADIUS 500m |
| Intersection_00B | TARGET POSITION INFORMATION<br>  –LATITUDE: xxx, LONGITUDE yyy<br>DELIVERY AREA INFORMATION<br>  –CENTERED ON TARGET POSITION<br>    INFORMATION RADIUS 500m |

COMMUNICATION APPARATUS, INFORMATION PROCESSING APPARATUS, DELIVERY SYSTEM, AND CONTROL METHODS AND STORAGE MEDIUM

BACKGROUND OF THE INVENTION

Field of the Invention

The present invention relates to a communication apparatus, an information processing apparatus, a delivery system, and control methods and a storage medium.

Description of the Related Art

In recent years, proposals have been made of techniques for supporting drivers in terms of recognition, decision-making, and operation by installing a communication function for connecting to the Internet and a cloud to vehicles and obtaining various types of information such as road traffic information. In International Publication No. 2018/100661, a proposal is made of applying, as a method for providing notification of such information, an asynchronous message notification method called the publish-subscribe scheme, in which identifiers called "topics" are used. The publish-subscribe scheme includes a "broker" that mediates the communication between publisher devices and subscriber devices. The subscriber devices can receive messages posted by the publisher devices to the broker by subscribing and registering to the broker with respect to topics (publish messages) of interest.

Suppose a case where, by using a communication method such as the publish-subscribe scheme, a vehicle is notified of road traffic information obtained by analyzing videos from cameras installed on roads. In the publish-subscribe scheme, a publisher device and a subscriber device need to share a "topic" in some way. For example, each camera (publisher device) installed on a road manages an individual location on the road, such as an intersection, by associating a topic with the individual location, and posts road traffic information obtained by analyzing a video of the location to the broker together with the topic. The vehicle, which is a subscriber device, by registering to the broker with respect to a topic associated with a desired location, can receive road traffic information corresponding to the desired location that is published by a publisher device.

However, since the vehicle is a moving object, the road traffic information that the vehicle needs changes as the vehicle moves. Thus, it is difficult to provide the vehicle beforehand with topics that the vehicle will need. For example, it is conceivable to perform registration with respect to all topics published by publisher devices. However, in this case, a load will be imposed on the subscriber device because the subscriber device would need to choose an appropriate topic from among a large number of topics. Furthermore, there is a problem that the subscriber device cannot follow topics that are dynamically generated by the publisher devices.

SUMMARY OF THE INVENTION

In one aspect of the present invention, a technique for allowing appropriate subscription/registration to be performed automatically so that useful information can be obtained at a low load is provided.

According to one aspect of the present invention, there is provided a communication apparatus comprising: a notifying unit configured to notify an external device of position information; a receiving unit configured to receive an identifier notified from the external device after notifying the position information; a storing unit configured to, after the identifier is received by the receiving unit, store the received identifier as management information for specifying a message that the communication apparatus is to subscribe to; and an obtaining unit configured to, in a case where a message delivered from outside and associated with the identifier stored as the management information is received, obtain information included in the received message.

According to another aspect of the present invention, there is provided an information processing apparatus comprising: a storing unit configured to store management information in which a geographic area corresponding to a message and an identifier corresponding to the messages are associated with one another, the management information being stored for a plurality of the identifiers; a receiving unit configured to receive position information from an external device; a selecting unit configured to select an identifier from among the plurality of identifiers based on the position information received by the receiving unit and the geographic area in the management information; a notifying unit configured to notify the external device of the identifier selected by the selecting unit; and a delivery unit configured to, in a case where the delivery of a message corresponding to the selected identifier is requested, deliver the message corresponding to the identifier.

According to another aspect of the present invention, there is provided a delivery system in which an information processing apparatus and a communication apparatus are connected with one another via wireless communication, the information processing apparatus comprising: a storing unit configured to store management information in which a geographic area corresponding to a message and an identifier corresponding to the message are associated with one another, the management information being stored for a plurality of the identifiers; an obtaining unit configured to obtain position information from the communication apparatus; a selecting unit configured to select an identifier from among the plurality of identifiers based on the position information obtained by the obtaining unit and the geographic area stored as the management information; a registering unit configured to register the communication apparatus as a delivery-target device to which a message corresponding to the identifier selected by the selecting unit is to be delivered; and a delivery unit configured to, in a case where the delivery of a message corresponding to the selected identifier is requested, deliver the message corresponding to the selected identifier.

According to another aspect of the present invention, there is provided a control method for a communication apparatus, the control method comprising: notifying an external device of position information; receiving an identifier which is notified from the external device after notifying the position information; after the identifier is received, storing the received identifier as management information for specifying a message that the communication apparatus is to subscribe to; and in a case where a message delivered from outside and associated with the identifier stored as the management information is received, obtaining information included in the received message.

According to another aspect of the present invention, there is provided a non-transitory computer-readable storage medium storing a program for causing a computer to execute a control method for a communication apparatus, the control method comprising: notifying an external device of position information: receiving an identifier which is notified from the external device after notifying the position information; after the identifier is received, storing the received identifier as management information for specifying a message that the communication apparatus is to subscribe to: and in a case where a message delivered from outside and associated with the identifier stored as the management information is received, obtaining information included in the received message.

Further features of the present invention will become apparent from the following description of exemplary embodiments with reference to the attached drawings.

BRIEF DESCRIPTION OF THE DRAWINGS

FIG. 3 is a block diagram illustrating an example of a functional configuration of cameras according to the first embodiment.

FIG. 4 is a block diagram illustrating an example of a functional configuration of a server according to the first embodiment.

FIG. 5 is a flowchart illustrating processing by the on-vehicle device according to the first embodiment.

FIG. 7 is a sequence diagram illustrating message delivery operations according to the first embodiment.

FIGS. 8A and 8B are diagrams illustrating examples of message formats.

FIG. 9 is a diagram illustrating an example of a data configuration of a topic management table according to the first embodiment.

DESCRIPTION OF THE EMBODIMENTS

Figure 1:
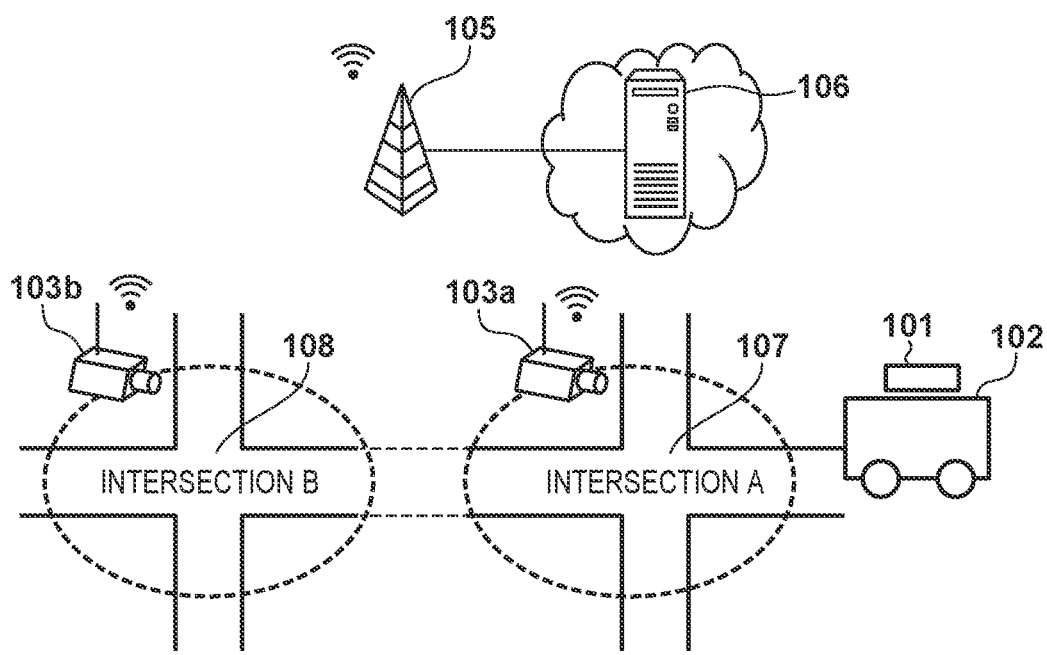
FIG. 1 is a diagram illustrating an example of a configuration of a delivery system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[System Configuration]

FIG. 1 is a diagram illustrating an example of a configuration of a delivery system according to a first embodiment. In FIG. 1, a vehicle 102 is traveling on a road toward an intersection B 108, and is approaching an intersection A 107. The vehicle 102 is one example of a moving object that moves with an on-vehicle device 101 mounted thereon. The on-vehicle device 101 is a communication apparatus that can perform wireless communication. The on-vehicle device 101 realizes the exchange of messages according to the publish-subscribe scheme via a server 106 by performing wireless communication with the server 106 via a base station 105. The on-vehicle device 101 plays the role of a subscriber device in such a message exchange scheme.

The server 106 performs various types of data processing. By performing wireless communication, the server 106 can connect to the on-vehicle device 101 and to cameras 103a and 103b via the base station 105. The cameras 103a and 103b (collectively referred to as cameras 103 hereinafter) are installed on a road, and photograph the traffic conditions at intersections or the like. Furthermore, the cameras 103 can analyze road conditions from captured image data obtained by photographing, and can wirelessly notify other devices of the analysis results. In the above-described exchange of messages according to the publish-subscribe scheme, the cameras 103 play the role of publisher devices.

The base station 105 wirelessly connects to the on-vehicle device 101, the cameras 103, and the server 106, and relays wireless communication among such devices. Thus, the base station 105 allows the on-vehicle device 101 and the cameras 103 to communicate with the server 106, which is located on the Internet or a cloud. The base station 105 allows the on-vehicle device 101, the cameras 103, and the server 106 to communicate over the same network.

[Functional Configuration of Devices]

Next, the functional configurations of the on-vehicle device 101, the cameras 103, and the server 106 according to the present embodiment will be described. Note that the configuration of functional blocks described in the following is only one example. Some (or in some cases, all) of the described functional blocks may be replaced with other functional blocks achieving similar functions, some functional blocks may be omitted, and additional functional blocks may be added. Furthermore, a functional block mentioned in the following description may be split into a plurality of functional blocks, and a plurality of functional blocks may be integrated into one functional block.

Figure 2:
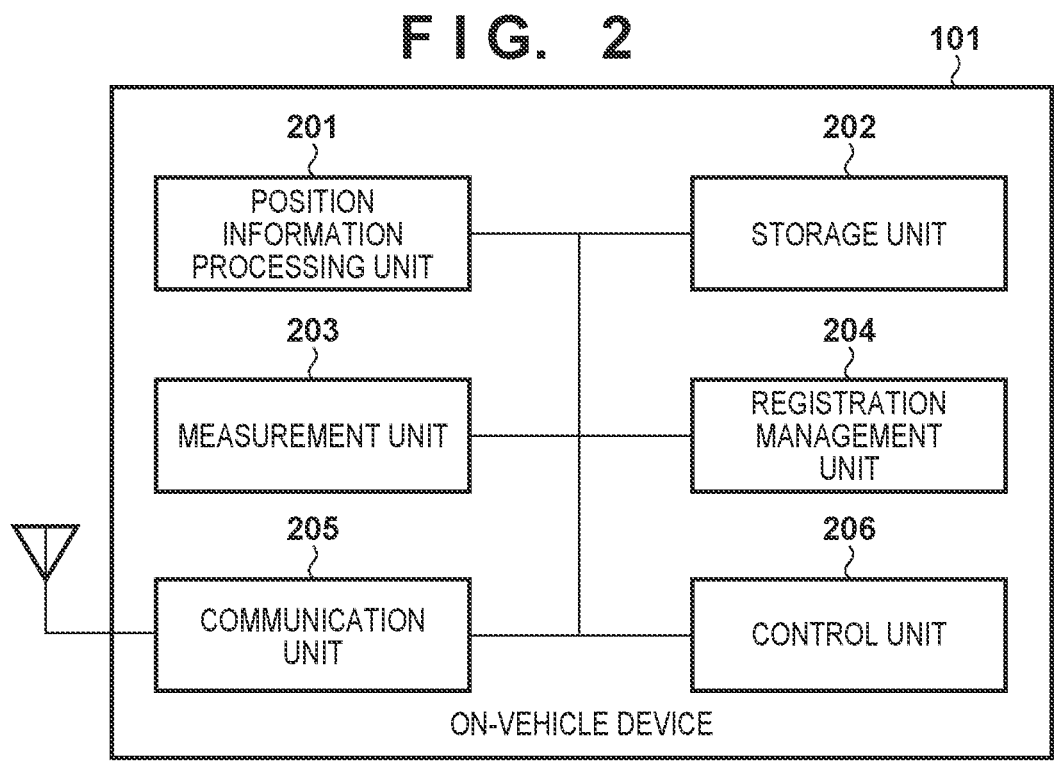
FIG. 2 is a block diagram illustrating an example of a functional configuration of an on-vehicle device according to the first embodiment.

FIG. 2 is a block diagram illustrating an example of a functional configuration of the on-vehicle device 101 according to the present embodiment. A position information processing unit 201 obtains, manages, and processes position information indicating the position of the vehicle 102 having the on-vehicle device 101 mounted thereon. The position information can be obtained from a Global Navigation Satellite System (GNSS) receiver, an odometer, a gyrosensor, an acceleration sensor, etc., provided in the vehicle 102. A storage unit 202 stores topic information necessary for the publish-subscribe scheme, etc. A measurement unit 203 measures the moving distance, the moving time, or the like of the vehicle 102 while the vehicle 102 is traveling. A registration management unit 204, by conforming to the publish-subscribe scheme, manages the state of subscription/registration to topics using a message for subscription/registration with respect to a topic and a message for requesting cancellation of the subscription/registration.

A communication unit 205 performs wireless communication with other devices via the base station 105. For example, the communication unit 205 sends messages generated by the registration management unit 204 to the server 106 via the base station 105. Furthermore, the communication unit 205 receives messages, etc., from the server 106 via the base station 105. A control unit 206 controls the entire on-vehicle device 101 and controls the above-described functional units, for example.

FIG. 3 is a block diagram illustrating an example of a functional configuration of a camera 103 according to the present embodiment. A camera function processing unit 301 implements conventional camera functions such as photographing. A storage unit 302 stores information relating to the camera functions, the position information of the camera, an effective area of photographic data, etc. Furthermore, the storage unit 302 stores a topic name that is associated with the position information of the camera, the effective area of photographic data, etc. A topic name is information uniquely specifying a topic in the delivery system, and is also referred to as a topic identifier. In the present example, in the camera 103*a*, which is installed near the intersection A 107, the position information of the camera and the effective area of photographic data are stored so as to be associated with the topic name "Intersection_00A". In the camera 103*b* near the intersection B 108, the position information of the camera and the effective area of photographic data are stored so as to be associated with the topic name "Intersection_00B". A video analysis unit 303 analyzes a video photographed by the camera function processing unit 301 and analyzes road conditions at an intersection or the like. Specifically, the video analysis unit 303 detects events that may affect the driving of vehicles, such as the presence/absence of accidents, traffic jams, emergency vehicles, construction vehicles, vehicles traveling in an abnormal fashion, etc., and generates road traffic information based on the result of the detection.

A message deliver unit 304 performs publisher-side message processing in the publish-subscribe scheme. Specifically, the message deliver unit 304 generates a publish/deliver request for publishing/delivering a message indicating the result (road traffic information) of the analysis by the video analysis unit 303, and supplies the publish/deliver request to a communication unit 305. The publish/deliver request includes the message indicating the road traffic information and the topic name stored in the storage unit 302. By performing wireless communication, the communication unit 305 sends the publish/deliver request generated by the message deliver unit 304 to the server 106 via the base station 105. A control unit 306 controls the above-described functional units inside the camera 103.

FIG. 4 is a block diagram illustrating an example of a functional configuration of the server 106 according to the present embodiment. A topic selection unit 401, based on position information received from the on-vehicle device 101, selects one or more topics to which the on-vehicle device 101 is to be subscribed/registered. In order to perform such a selection, the topic selection unit 401 uses topic management information stored in a storage unit 402. The management information in the present embodiment is information in which a topic name (topic identifier) and a geographic area corresponding to the topic are associated with one another. FIG. 9 is a diagram illustrating an example of a data configuration of a topic management table that is one example of the management information. In the topic management table, a "topic name (identifier)" that a camera 103 uses during publishing/delivery and a geographic "delivery area" of the publishing/delivery by the camera 103 are stored so as to be associated with one another. The "delivery area" is expressed using "target position information" indicating the geographic installation location of the camera 103, and "delivery area information" indicating the size of the delivery area of the camera 103. The geographic areas corresponding to the topics are the areas indicated by the "delivery area information".

Such information included in the topic management table may be statically recorded in advance, or may be obtained from the cameras 103 during or immediately after connection processing with the cameras 103 is performed. In the latter method for example, each camera 103 associates the topic name used to publish a message with attribute information, which includes the position information of the camera (corresponding to the target position information) and the effective area of data (corresponding to the delivery area information), and notifies the server 106 of them. In the server 106, a control unit 405 generates the topic management table from such information notification of which is provided from the cameras 103, and stores the topic management table to the storage unit 402. The topic selection unit 401 selects one or more topics to be received by the on-vehicle device 101 by comparing the position information received from the on-vehicle device 101 and the delivery areas recorded in the topic management table. Specifically, the topic selection unit 401 selects topics including the position indicated by the position information in the delivery area thereof.

Returning to FIG. 4, a broker unit 403 mediates the communication between publisher devices (the cameras 103 in the present example) and subscriber devices (the on-vehicle device 101 in the present example) in the publish-subscribe scheme. For example, upon receiving a subscribe/register request from an external device, the broker unit 403 associates the IP address, port number, etc., of the external device, with the topic name specified in the subscribe/register request and stores them in the storage unit 402. Thus, the external device is subscribed/registered with respect to the specified topic name. In addition, upon receiving a publish/deliver request from a publisher device, the broker unit 403 generates a publish message to be delivered to one or more subscriber devices based on the publish message included in the publish/deliver request. Furthermore, via a communication unit 404, the broker unit 403 delivers the publish message to one or more external devices subscribed/registered with respect to the topic name specified by the publish/deliver request.

The communication unit 404 realizes communication with the cameras 103 and the on-vehicle device 101 via the base station 105. The communication unit 404 receives subscribe/register requests and publish/deliver requests to be processed by the broker unit 403, and delivers publish messages generated by the broker unit 403. A control unit 405 controls the above-described functional units of the server 106.

[Hardware Configuration]

Figure 14:
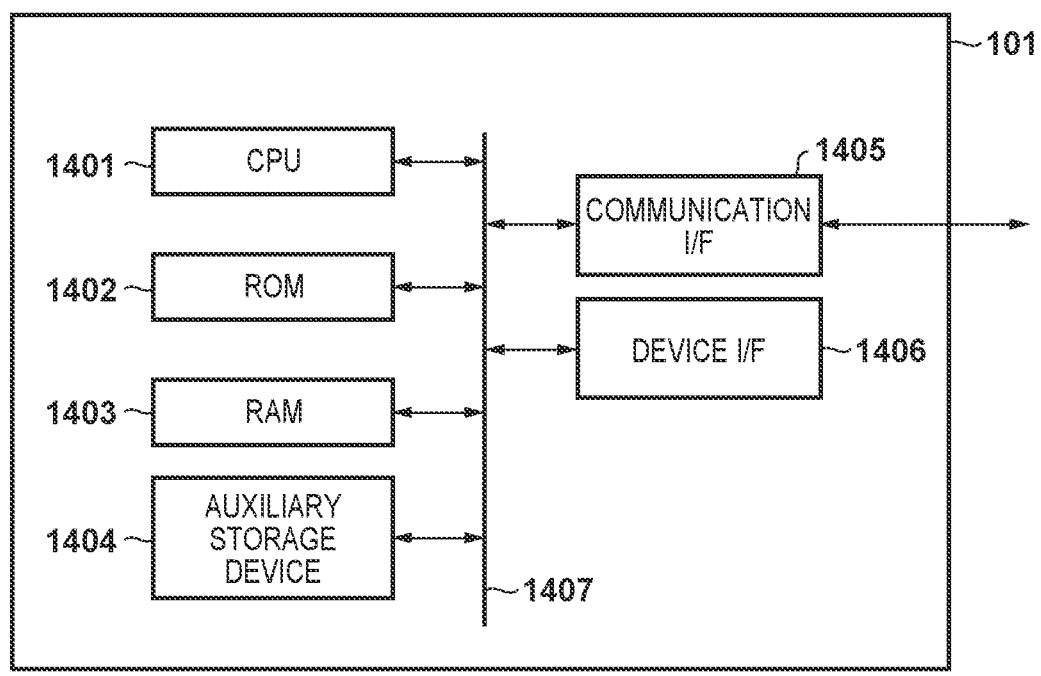
FIG. 14 is a block diagram illustrating an example of a hardware configuration of the on-vehicle device.

FIG. 14 is a block diagram illustrating an example of a hardware configuration of the on-vehicle device 101. The on-vehicle device 101 includes a CPU 1401, a ROM 1402, a RAM 1403, an auxiliary storage device 1404, a communication interface 1405, a device interface 1406, and a bus 1407. The CPU 1401 realizes the functions of the on-vehicle device 101 illustrated in FIG. 2 by controlling the entire on-vehicle device 101 using data and a control program stored in the ROM 1402 or the RAM 1403. Note that the on-vehicle device 101 may include one or more dedicated pieces of hardware that are different from the CPU 1401, and the dedicated hardware may execute at least part of the processing by the CPU 1401. Examples of the dedicated hardware include an application specific integrated circuit (ASIC), a field-programmable gate array (FPGA), a digital signal processor (DSP), etc. The ROM 1402 stores programs, etc., that do not need to be changed. The RAM 1403 temporarily stores programs and data supplied from the auxiliary storage device 1404, data supplied from the outside via the communication interface 1405, etc. The auxiliary storage device 1404 is configured using a hard disk drive or the like, for example, and stores various types of data.

The communication interface 1405 is used for communication with external devices. For example, the communication unit 205 uses the communication interface 1405 to perform wireless communication with the server 106, which is an external device. Various devices are connected to the device interface 1406. For example, a display device for displaying, to a user, messages (road traffic information) received from the server 106 may be connected to the device interface 1406. Furthermore, a GNSS receiver, an odometer, a gyrosensor, an acceleration sensor, etc., for obtaining position information indicating the position of the vehicle 102 may be connected to the interface 1406. The bus 1407 connects the above-described units in the on-vehicle device 101 and transmits information thereto.

An example of the hardware configuration of the on-vehicle device 101 has been described with reference to FIG. 14 above. However, the cameras 103 and the server 106 can also be realized using a similar hardware configuration. For example, if a camera 103 has a hardware configuration as illustrated in FIG. 14, an image-capturing unit including a mechanism for executing the capturing of images may be connected to the device interface 1406.

[Example of Processing]

Figure 6:
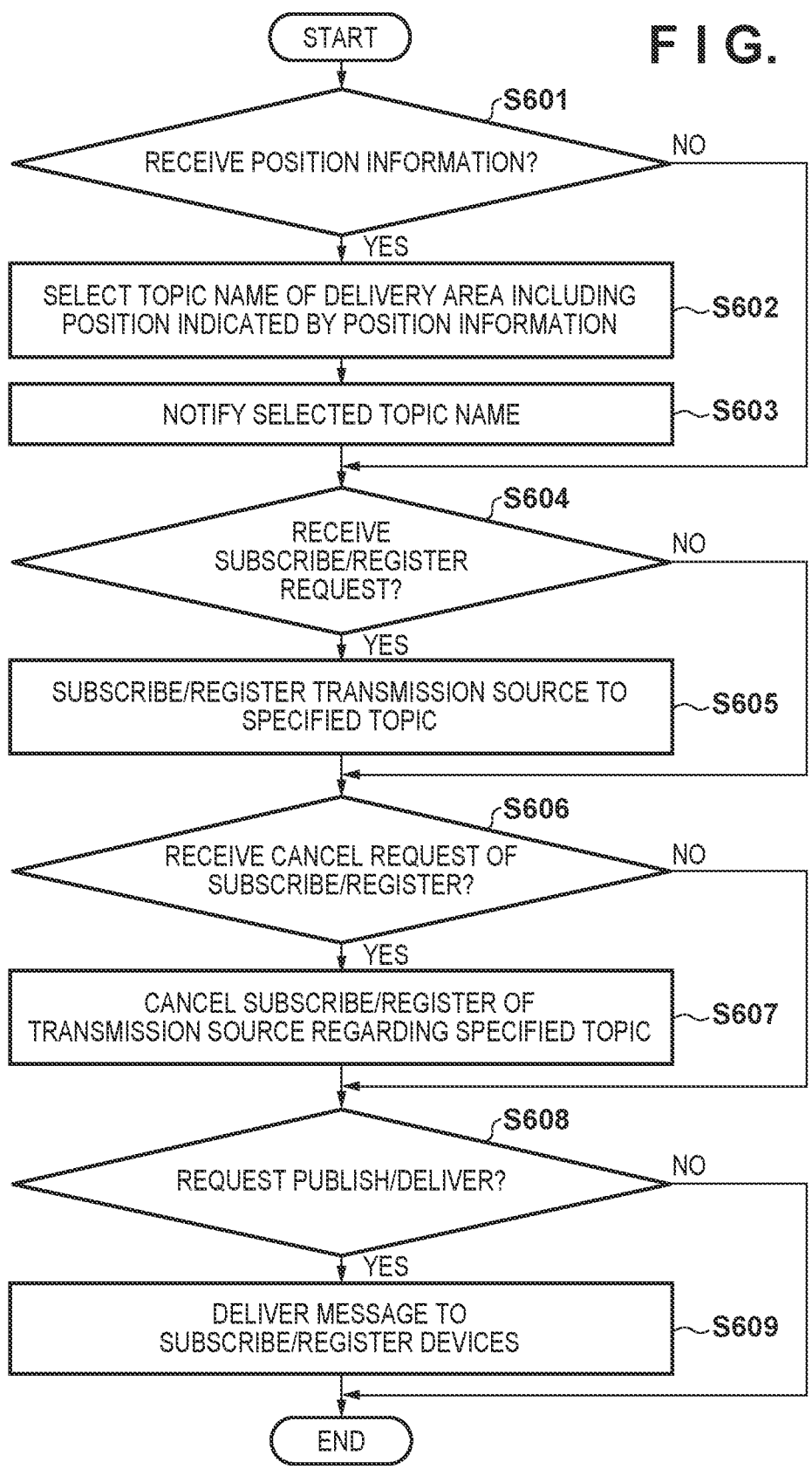
FIG. 6 is a flowchart illustrating processing by the server according to the first embodiment.

Message delivery processing by the delivery system according to the present embodiment will be described with reference to the flowcharts illustrated in FIGS. 5 and 6, and the operation sequence diagram illustrated in FIG. 7. FIG. 5 is a flowchart illustrating processing executed by the on-vehicle device 101. The processing indicated by the flowchart in FIG. 5 may be realized by the control unit 206 executing a control program stored in the storage unit 202 and thereby computing and processing information and controlling pieces of hardware. FIG. 6 is a flowchart illustrating processing executed by the server 106. The processing indicated by the flowchart in FIG. 6 may be realized by the control unit 306 executing a control program stored in the storage unit 302 and thereby computing and processing information and controlling pieces of hardware. FIG. 7 is a sequence diagram illustrating operations of the delivery system in the message delivery processing according to the first embodiment.

The on-vehicle device 101, the camera 103a, the camera 103b, and the server 106 are in a state of being capable of communicating with one another over the same network via the base station 105. The on-vehicle device 101, the camera 103a, the camera 103b, and the server 106 perform connection processing by following a protocol for realizing the publish-subscribe scheme (steps F701, F702, and F703). Examples of protocols for the publish-subscribe scheme include MQ Telemetry Transport (MQTT), Robot Operating System (ROS), etc. Any known protocol may be used in the present embodiment.

In the on-vehicle device 101, the position information processing unit 201 obtains position information of the vehicle 102 having the on-vehicle device 101 mounted thereon from the vehicle 102 (step S501). Here, suppose that the vehicle 102 is traveling through the location "intersection A 107" in FIG. 1. Note that, while the position information is actually formed from complicated pieces of data from a GNSS receiver, a gyrosensor, an acceleration sensor, etc., such pieces of data are collectively referred to here as "intersection A position information". Via the communication unit 205, the control unit 206 notifies the server 106 of the "intersection A position information" obtained by the position information processing unit 201, and waits for a response from the server 106 (steps S502 and F704). Furthermore, the on-vehicle device 101 needs to notify the server 106 of position information updated as the vehicle 102 moves. In the present embodiment, the on-vehicle device 101 obtains and notifies the server 106 of position information at predetermined time intervals (for example, every second). Accordingly, the measurement unit 203 starts measuring time to determine whether or not a predetermined amount of time has elapsed (step S503). Note that, while the elapse of a predetermined amount of time is used as the notification timing of position information in the present embodiment, there is no limitation to this. For example, a configuration may be adopted such that a notification of position information is provided each time the vehicle 102 moves a predetermined distance (for example, 500 m). In this case, the measurement unit 203 measures the moving distance of the vehicle 102. Furthermore, both the elapse of a predetermined amount of time and the movement over a predetermined distance may be used. That is, a configuration may be adopted such that position information is obtained each time the elapse of a predetermined amount of time or the movement over a predetermined distance is detected.

In the server 106, upon receiving position information (the "intersection A position information" here) of the vehicle 102 from the on-vehicle device 101 via the communication unit 404 (YES in step S601), the broker unit 403 supplies the position information to the topic selection unit 401 (step F705). The topic selection unit 401 refers to the topic management table (FIG. 9), and selects one or more topic names including the position indicated by the received position information ("intersection A position information") in the delivery area thereof (step S602). Here, suppose that the latitude and longitude included in the "intersection A position information" are within the area indicated by the delivery area information associated with the topic name "Intersection_00A" in the topic management table. In this case, the topic selection unit 401 selects the topic name "Intersection_00A" (step F706). Via the communication unit 404, the broker unit 403 notifies the on-vehicle device 101 of the topic name (topic identifier) selected by the topic selection unit 401 (steps S603 and F707).

In the on-vehicle device 101, upon receiving the topic name from the server 106 via the communication unit 205 (YES in step S504), the control unit 206 performs subscription/registration management processing (steps S505 to S508). Note that, if no notification of a topic name is received from the server 106 in response to the position information notification of which was provided in step S502 (NO in step S504), processing proceeds to step S509, and the subscription/registration management processing is skipped. The subscription/registration management processing is performed in accordance with the topic name notification of which is provided from the server 106 and the state (topic registration state) of subscription/registration with respect to the topic name. In this example, the on-vehicle device 101 has not performed subscription/registration up to this point, and there is no registration-complete topic (NO in step S505). Accordingly, the registration management unit 204 makes a subscribe/register request to the server 106 with respect to the topic name received in step S504 (steps S508 and F708). Specifically, the registration management unit 204 generates a subscribe/register request message using the received topic name, and sends the message to the server 106 via the communication unit 205. After making the subscribe/register request, the registration management unit 204 manages the topic name as a registration-complete topic.

A specific example of a subscribe/register request message generated by the registration management unit 204 will be described with reference to the example message formats illustrated in FIGS. 8A and 8B. The format illustrated in FIG. 8B is used for subscribe/register requests. In a subscribe/register request message, "subscribe" is set to "message type", and the subscription/registration-target topic name is set to "topic name". "Message length" and "topic length" are set as appropriate.

In the server 106, upon receiving the subscribe/register request from the on-vehicle device 101 via the communication unit 404, the broker unit 403 subscribes/registers the on-vehicle device 101 with respect to the topic name included in the request (YES in step S604, and step S605). Note that the on-vehicle device 101 is the communication apparatus that is the transmission source of the request. For example, the broker unit 403 stores, to the storage unit 402, the topic identified by the topic name included in the subscribe/register request so as to be associated with the IP address, port number, etc., of the on-vehicle device 101. Thus, the on-vehicle device 101 is subscribed/registered with respect to the topic name "Intersection_00A" in the broker unit 403.

Note that, while subscription/registration is performed by the server 106 providing a notification of a topic name selected based on position information received from the on-vehicle device 101, and the on-vehicle device 101 making a subscribe/register request with respect to the topic name that the on-vehicle device 101 is notified of in the above, there is no limitation to this. For example, in the server 106 having received position information from the on-vehicle device 101, the topic selection unit 401 may select a topic based on the position information, and the broker unit 403 may subscribe/register the on-vehicle device 101 with respect to the selected topic. Alternatively, a configuration may be adopted such that the on-vehicle device 101 makes a subscribe/register request upon notifying the server 106 of position information. In this case, the on-vehicle device 101 sets "subscribe" to "message type" without setting any information to "topic name" in the format illustrated in FIG. 8B, and sends the subscribe/register request with position information added thereto, for example. Note that information indicating an unknown state may be set to "topic name". In the server 106 having received this register request, the topic selection unit 401 selects a topic name based on the position information added to the subscribe/register request, and the broker unit 403 subscribes/registers the on-vehicle device 101 with respect to the selected topic. In each of the above-described cases, the server 106 notifies the on-vehicle device 101 of the topic name which has been selected by the topic selection unit 401 and with respect to which subscription/registration has been performed by the broker unit 403. The on-vehicle device 101 can manage the received topic name as a registration-complete topic.

Meanwhile, the cameras 103a and 103b installed on the road respectively photograph the intersection A 107 and the intersection B 108. As described above, the cameras 103a and 103b are each provided with the video analysis unit 303, which analyzes captured video data. The video analysis unit 303 analyzes photographic data, generates road traffic information as a result of the analysis, and publishes and delivers a message including the generated road traffic information.

Here, suppose that an accident occurs at the intersection A 107, which the vehicle 102 is approaching. The camera 103a analyzes captured image data using the video analysis unit 303, and recognizes that an accident has occurred at the intersection A 107. The message deliver unit 304 of the camera 103a forms a message having a publishable/deliverable format from this analysis result (road traffic information). Specifically, the message deliver unit 304 performs publishing/delivery using the format illustrated in FIG. 8A. "Publish" is set to "message type", and the topic name "Intersection_00A" associated with the installation location or the like of the camera 103a is set to "topic name". Furthermore, the above-described analysis result (road traffic information) is stored to "message", and "message length" and "topic length" are set as appropriate. The message deliver unit 304 sends the message generated in such a manner to the server 106 via the communication unit 305 as a publish/deliver request (step F709).

Upon receiving the publish/deliver request from the camera 103a (YES in step S608), the broker unit 403 in the server 106 delivers the message included in the request to one or more devices subscribed/registered with respect to the topic name included in the request (step S609). Here, the on-vehicle device 101 is subscribed/registered with respect to the topic "Intersection_00A" as described above. Accordingly, the publish message received from the camera 103a is delivered to the on-vehicle device 101 (step F710). As a result of the above processing, the on-vehicle device 101 can receive the publish message published by the camera 103a (step S509), and can thereby ascertain that an accident has occurred near the intersection A 107.

Subsequently, once the vehicle 102 moves and the measurement unit 203 in the on-vehicle device 101 detects the elapse of a predetermined amount of time (YES in step S510, and step F711), the processing illustrated in FIG. 5 is terminated, and processing is started again from step S501. That is, in the on-vehicle device 101, the position information processing unit 201 obtains position information of the vehicle 102 from the vehicle 102 again (step S501). Here, suppose that the vehicle 102 has moved to near the "intersection B 108" in FIG. 1, and the position information processing unit 201 receives "intersection B position information". The control unit 206 notifies the server 106 of the "intersection B position information", which is the obtained position information, and waits for a response (steps S502 and F712).

In the server 106 having received the "intersection B position information", the topic selection unit 401 refers to the topic management table (FIG. 9) and selects one or more topic names including the "intersection B position information" in the delivery area thereof (steps S601, S602, and F713). In this example, the topic selection unit 401 selects the topic name "Intersection_00B" (step F714). Via the communication unit 404, the broker unit 403 notifies the on-vehicle device 101 of the topic name selected by the topic selection unit 401 (steps S603 and F715).

In the on-vehicle device 101, when the topic name "Intersection_00B" is received via the communication unit 205 (YES in step S504), the registration management unit 204 performs the subscription/registration management processing (steps S505 to S508). At this time, in the on-vehicle device 101, "Intersection_00A" is already a registration-complete topic, and thus there is a registration-complete topic (YES in step S505). The topic name "Intersection_00B", notification of which is newly provided, is a registration-incomplete topic, and notification of only this registration-incomplete topic is provided from the server 106. In this case, processing branches from step S506 (NO) to step S507. The registration management unit 204 makes a subscribe/register cancellation request with respect to topics other than the topic name received in step S504 among the topics (registration-complete topics) for which subscription/registration is already complete (steps S507 and F716). Here, the registration management unit 204 makes a subscribe/register cancellation request with respect to the registration-complete topic "Intersection_00A", for which the subscription/registration processing has been performed earlier. A topic for which a subscribe/register cancellation request has been made is treated as a registration-incomplete topic. A specific subscribe cancellation request message will be described with reference to the example message format illustrated in FIG. 8B. The registration management unit 204 sets "unsubscribe" to "message type" in the format in FIG. 8B, and sets the topic name for which registration is to be cancelled (here, "Intersection_00A") to "topic name". After setting "message length" and "topic length" as appropriate, the registration management unit 204 sends this message (subscribe/register cancellation request) to the server 106 via the communication unit 205.

In the server 106, when the subscribe/register cancellation request is received from the on-vehicle device 101 via the communication unit 404 (YES in step S606), the broker unit 403 cancels the subscription/registration of the on-vehicle device 101 (step S607). The subscription/registration that is cancelled here is the subscription/registration of the on-vehicle device 101 with respect to the topic specified in the subscribe/register cancellation request. Specifically, the broker unit 403 deletes the IP address, port number, etc., relating to the device by which the request for registration cancellation has been made from a list of subscription/registration information relating to the topic specified in the subscribe/register cancellation request.

In the on-vehicle device 101, after cancelling the subscription/registration with respect to the topic name "Intersection_00A", the registration management unit 204 performs the subscription/registration processing with respect to the topic name "Intersection_00B" (step S508 and F717). The subscription/registration processing is as described in relation to step S509. Following this, the on-vehicle device 101 can obtain information regarding the vicinity of the intersection B 108, which is the area the vehicle 102 is traveling (steps F718 and F719).

Note that, while a case where notification is provided only of a registration-incomplete topic has been described above, there are also cases where notification is provided of both a registration-incomplete topic and a registration-complete topic. For example, suppose a case where notification is provided of two topic names, namely "Intersection_00A" and "Intersection_00B", in a state in which registration has already been completed with respect to the topic "Intersection_00A". Processing proceeds from step S506 to step S507 also in this case, but no subscribe/register cancellation request is generated because there is no topic that has ceased to be specified among the topics for which subscription/registration has been performed. Subsequently, the registration management unit 204 issues, to the server 106, a subscribe/register request with respect to the topic name "Intersection_00B". Thus, the registration management unit 204 performs the subscription/registration processing with respect to "Intersection_00B", which is a registration-incomplete topic, and maintains the registration with respect to "Intersection_00A". Furthermore, a case where notification is provided of only a registration-complete topic can also be considered. For example, suppose a case where notification of only the topic "Intersection_00A" is provided from the server 106 in a state in which registration has already been completed with respect to the topic "Intersection_00A". In this case, because registration has already been completed for the topic notification of which has been provided (YES in step S506), processing proceeds to step S509, and subscription/registration is not updated. Furthermore, while a case where notification is provided of one each of a registration-complete topic and a registration-incomplete topic has been described above, notification may be provided of a plurality of registration-complete topics and a plurality of registration-incomplete topics. For example, if notification is provided of a plurality of topics in a state in which there is no registration-complete topic (NO in step S505), the subscription/registration processing is performed for all of these topics in step S508.

As described up to this point, the on-vehicle device 101 operates as a subscriber and notifies the server 106, which has a topic management function, of position information of the vehicle 102 having the on-vehicle device 101 mounted thereon. The topic management function of the server 106 selects one or more topics based on the position information. By the on-vehicle device 101 being subscribed/registered with respect to the selected topics, the on-vehicle device 101 can receive messages suitable for the on-vehicle device 101 among various messages that are published and delivered. In such a manner, appropriate subscription/registration is realized by the on-vehicle device 101 notifying the server 106 of position information of the vehicle 102, and it becomes unnecessary for the on-vehicle device 101 to select topics for which subscription/registration is to be performed or to filter publish messages. Thus, the on-vehicle device 101 can obtain road traffic information suitable for the driver of the vehicle 102 at a low load and with little delay.

Second Embodiment

In the first embodiment, description has been provided of an example of processing in which subscription/registration is managed and updated based on the position where a vehicle is traveling. In the second embodiment, description will be provided of a delivery system in which subscription/registration is managed and updated based on position information of a destination to which a vehicle is moving.

[Example of Configuration]

Figure 10:
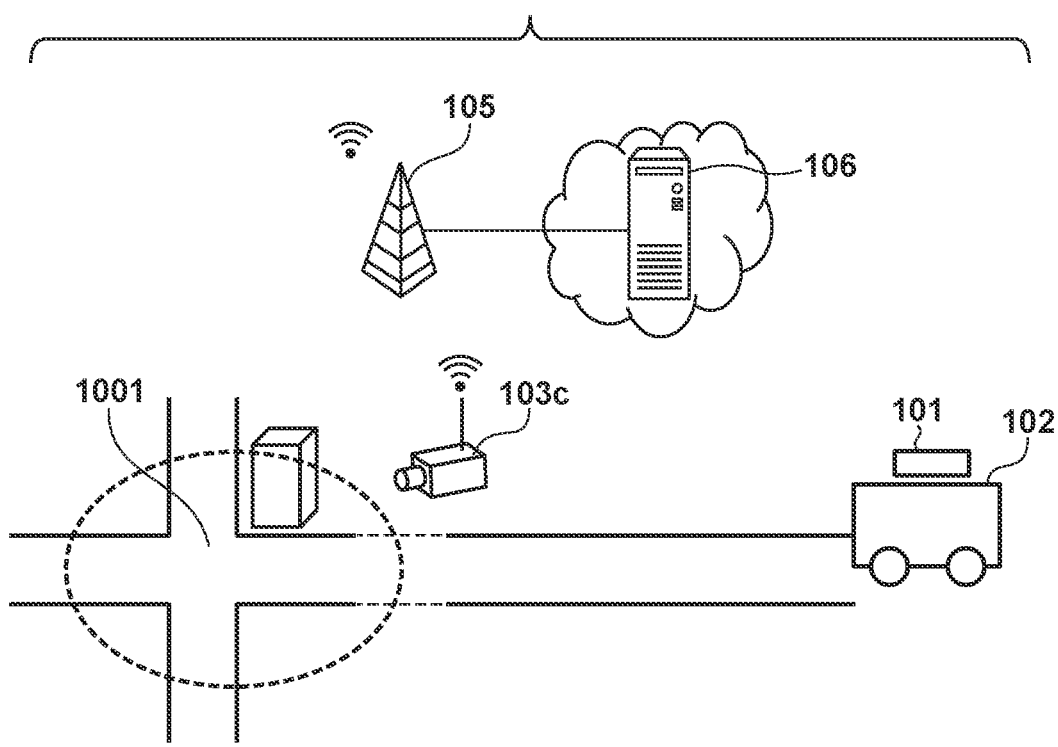
FIG. 10 is a diagram illustrating an example of a configuration of a delivery system according to a second embodiment.

FIG. 10 is a diagram illustrating an example of a configuration of a delivery system according to the second embodiment. FIG. 10 illustrates a state in which the vehicle 102 is traveling toward a destination 1001. A camera 103c is installed on a road near the destination 1001, and photographs roads near the destination 1001. The functional configuration and the hardware configuration of the on-vehicle device 101, the camera 103c, and the server 106 illustrated in FIG. 10 are similar to those in the first embodiment (FIGS. 2-4 and 14).

[Example of Processing]

Figure 11:
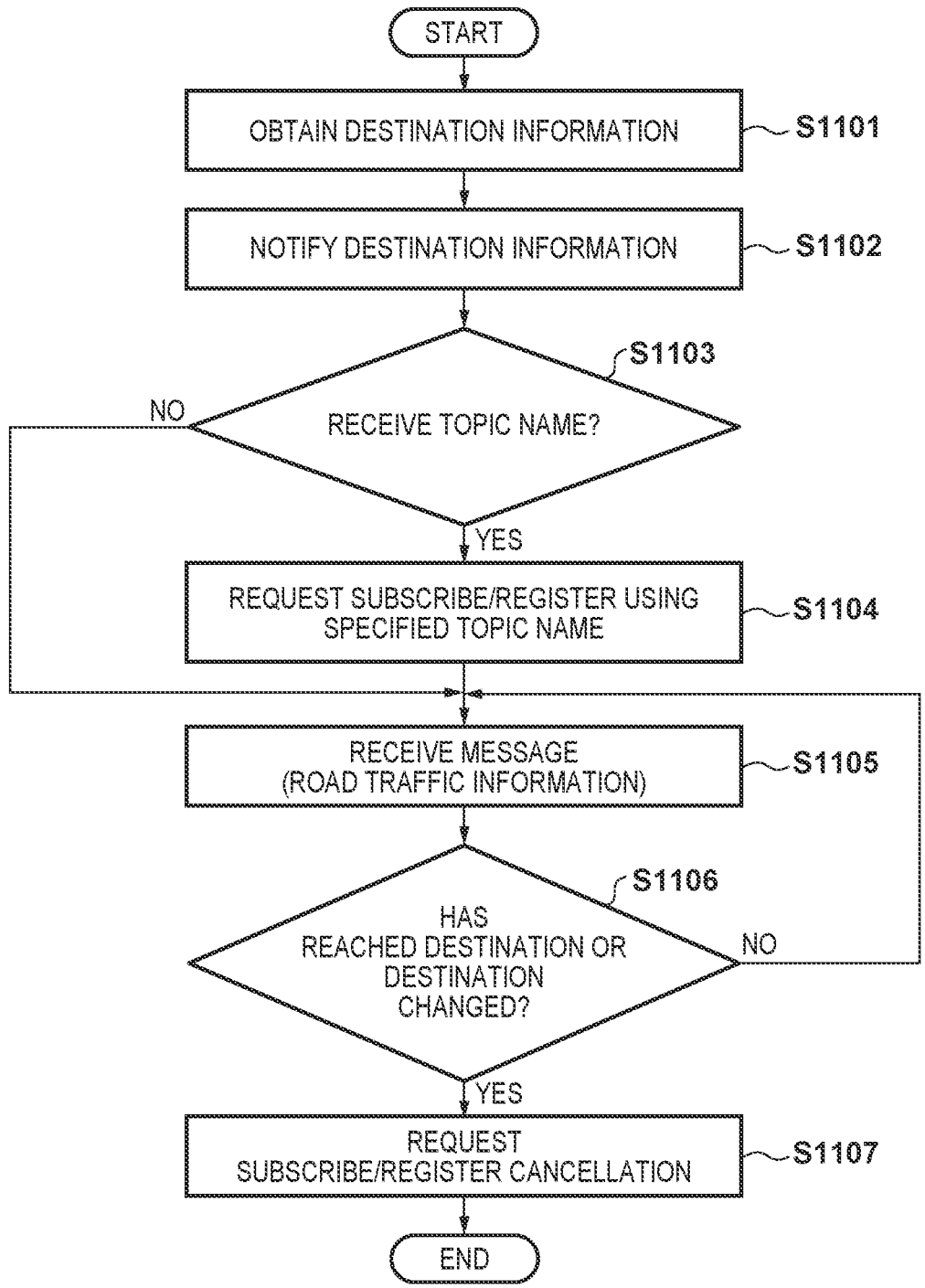
FIG. 11 is a flowchart illustrating processing by the on-vehicle device according to the second embodiment.
Figure 12:
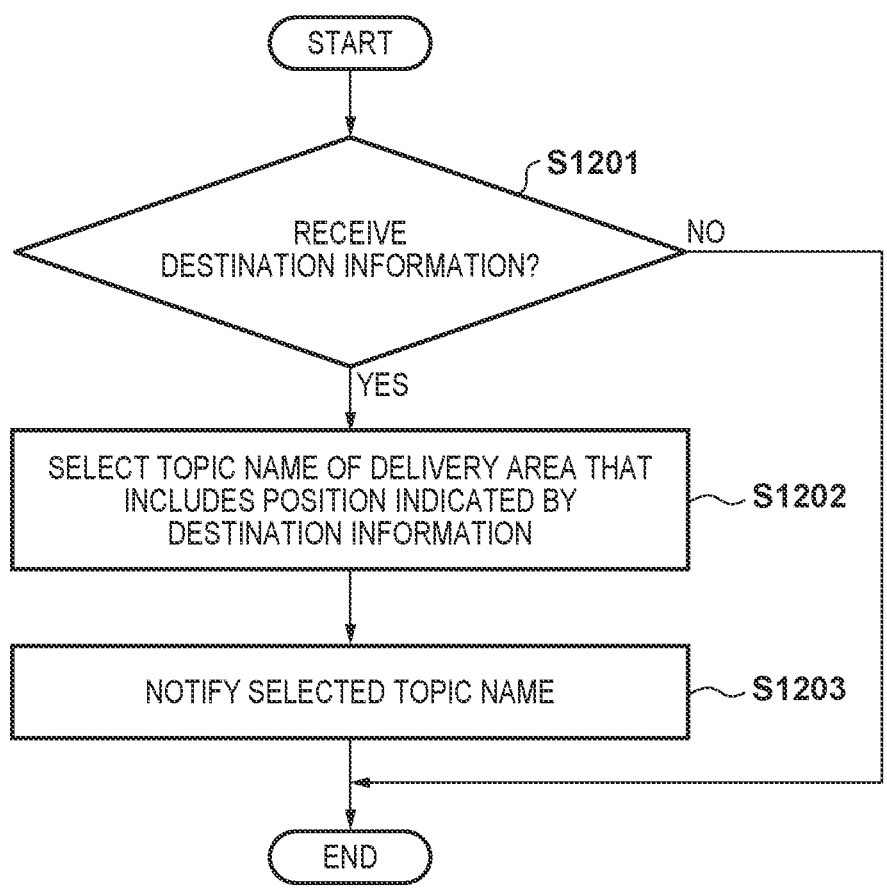
FIG. 12 is a flowchart illustrating processing by the server according to the second embodiment.
Figure 13:
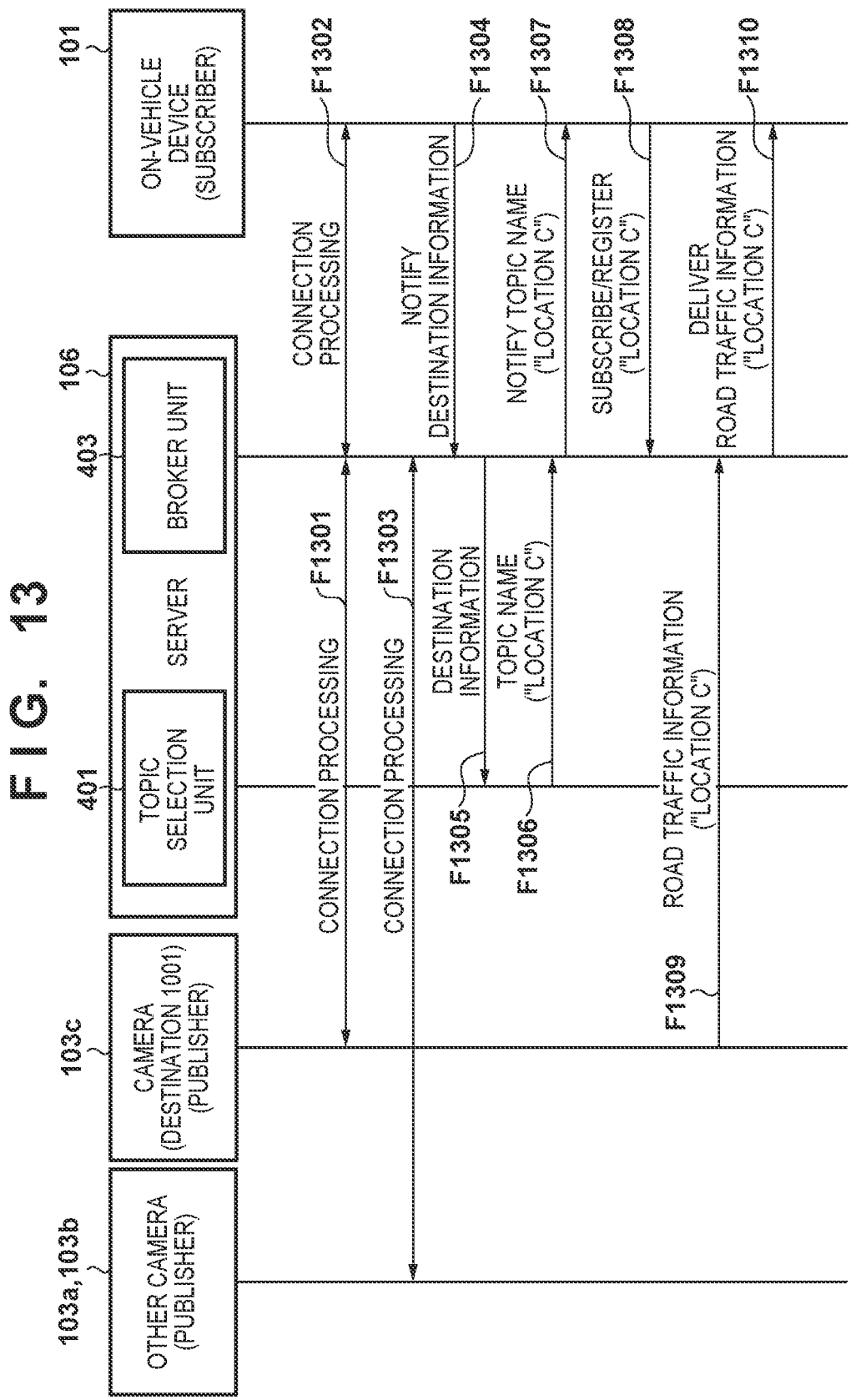
FIG. 13 is a sequence diagram illustrating message delivery operations according to the second embodiment.

In the following, operations in the second embodiment will be described with reference to the flowcharts illustrated in FIGS. 11 and 12, and the operation sequence diagram illustrated in FIG. 13. FIG. 11 is a flowchart illustrating processing executed by the on-vehicle device 101 according to the second embodiment. This processing may be realized by the control unit 206 executing a control program stored in the storage unit 202 and thereby computing and processing information and controlling pieces of hardware. FIG. 12 is a flowchart illustrating processing executed by the server 106 according to the second embodiment. This processing may be realized by the control unit 306 executing a control program stored in the storage unit 302 and thereby computing and processing information and controlling pieces of hardware. FIG. 13 is a sequence diagram illustrating operations of the delivery system in the message delivery processing according to the second embodiment.

The on-vehicle device 101, the cameras 103, and the server 106, which are capable of communicating with one another over the same network via the base station 105, perform connection processing by following a protocol for realizing the publish-subscribe scheme (steps F1301, F1302, and F1303). In FIG. 13, the camera 103c installed at the destination 1001 and other cameras (cameras 103a and 103b) are illustrated as examples of the cameras 103. Examples of protocols for the publish-subscribe scheme include MQ Telemetry Transport (MQTT), Robot Operating System (ROS), etc. Any known protocol may be used in the present embodiment.

The position information processing unit 201 in the on-vehicle device 101 obtains position information (referred to as destination information hereinafter) of the destination from a car navigation system or the like of the vehicle 102 having the on-vehicle device 101 mounted thereon (step S1101). Here, the vehicle 102 is traveling toward the destination 1001 as illustrated in FIG. 10. Note that, while the destination information is actually formed from complicated data from a GNSS receiver, etc., such pieces of data are collectively referred to here as "location C position information". Via the communication unit 205, the control unit 206 in the on-vehicle device 101 notifies the server 106 of the "location C position information", which is the obtained destination information, and waits for a response from the server 106 (steps S1102 and F1304).

In the server 106, upon receiving the destination information "location C position information" of the vehicle 102 from the on-vehicle device 101 via the communication unit 404 (step S1201), the broker unit 403 provides the destination information to the topic selection unit 401 (step F1305). The topic selection unit 401 selects one or more topics including the position indicated by the "location C position information" in the delivery area thereof (step S1202), and notifies the broker unit 403 thereof (step F1306). Because the method for selecting topic names is similar to that in the first embodiment, description thereof will be omitted here. Here, description is provided supposing that "Position_00C" has been selected as a topic name related to the "location C position information". Via the communication unit 404, the broker unit 403 notifies the on-vehicle device 101 of the topic name selected by the topic selection unit 401 (steps S1203 and F1307).

Upon receiving the topic name "Position_00C" via the communication unit 205 (YES in step S1103, and step F1307), the registration management unit 204 in the on-vehicle device 101 makes a subscribe/register request to the server 106 using this topic name (step S1104 and F1308). Furthermore, the registration management unit 204 manages this topic name as a registration-complete topic. Because the topic registration method in the on-vehicle device 101 and the server 106 is similar to that in the first embodiment, description thereof is omitted here.

Meanwhile, the camera 103c installed on the road at the destination 1001 photographs nearby roads including the destination 1001. As described above, each camera is provided with the video analysis unit 303, which analyzes captured video data, and the camera analyzes photographic data using the function. Here, suppose that a traffic jam occurs near the destination 1001. The camera 103c analyzes captured image data using the video analysis unit 303, and recognizes that a traffic jam has occurred near the destination 1001, for example. The control unit 306 in the camera 103c forms a message having a publishable/deliverable format from the analysis result using the message deliver unit 304, and sends the message to the server 106 via the communication unit 305 (step F1309). The camera 103c delivers a publish message having "Position_00C" set to "topic name". Because the specific publish message delivery method is similar to that in the first embodiment, description thereof will be omitted here.

The on-vehicle device 101 receives the publish message published by the camera 103c (steps S1105 and F1310). The processing in which the on-vehicle device 101 receives the publish message from the camera 103c via the server 106 is similar to that in the first embodiment. Thus, detailed description thereof will be omitted here. The user is notified, by the on-vehicle device 101, of the message received in such a manner, and the user can ascertain the road traffic conditions around the destination 1001.

According to the subscription/registration management in the first embodiment, subscription/registration is updated in accordance with the current position of the vehicle 102. In contrast to this, the subscription/registration according to the second embodiment is performed based on the position of a destination, and thus is not updated until the vehicle 102 arrives at the destination or the destination is changed. Accordingly, the registration management unit 204 determines whether one of the following situations has occurred (step S1106). That is, the registration management unit 204 determines whether the destination has been reached or the destination has been changed. When it is determined that one of the situations has occurred (the destination has been reached or the destination has been changed) (YES in step S1106), the registration management unit 204 makes a request for cancellation of subscription/registration with respect to the topic for which subscription/registration has been completed through steps S1101 to S1104 (step S1107). Once the main processing is terminated in such a manner, processing from step S1101 is started again. On the other hand, if neither one of the situations has occurred (the destination has not been reached and the destination has not been changed) (NO in step S1106), the reception of messages relating to the topic for which subscription/registration has been completed is continued (step S1105).

Note that, while subscription/registration is performed based on destination information of the on-vehicle device 101 in the second embodiment, it is also conceivable to register, for subscription, the communication method of the communication unit 205 provided in the on-vehicle device 101 in parallel with such subscription/registration. For example, suppose a case where the communication unit 205 has a communication method with which large-capacity communication can be performed, and the on-vehicle device 101 notifies the server 106 of the communication method. The server 106 notifies the on-vehicle device 101 of the IP address, URL, etc., of the camera 103c if the communication method received from the on-vehicle device 101 is a communication method with which large-capacity communication can be performed. The on-vehicle device 101 can directly receive video data from the camera 103c using such information. Furthermore, a configuration may be adopted such that the on-vehicle device 101 executes both the registration management described in the first embodiment (configuration in which subscription/registration is updated in accordance with the current position of the vehicle 102) and the registration management described in the second embodiment (configuration in which subscription/registration is performed in accordance with the destination position.

As described up to this point, according to the second embodiment, the on-vehicle device 101 operating as a subscriber can receive appropriate publish messages by notifying the server 106 of the destination position of the vehicle 102. Accordingly, it becomes unnecessary to select topics for which subscription/registration is to be performed, to filter publish messages, etc., on the on-vehicle device 101 side, and thus notification of road traffic information suitable for the driver of the vehicle 102 can be provided without delay.

As described above, according to the above-described embodiments, the on-vehicle device 101 is subscribed/registered with respect to appropriate topics at a low load. Thus, road traffic information matching the traveling state of the vehicle 102 can be obtained, and drivers can be provided with more support in terms of recognition, decision-making, and operation.

Note that, while the on-vehicle device 101 is described as an example of a subscriber-side communication apparatus, and the vehicle 102 is described as an example of a moving object carrying the communication apparatus in the above-described embodiments, there is no limitation to this. For example, the subscriber-side communication apparatus may be a portable terminal, and the moving object carrying the portable terminal may be a person, a drone, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-144168, filed Sep. 3, 2021, which is hereby incorporated by reference herein in its entirety.

What is claimed is:

1. An information processing apparatus comprising:
at least one processor; and
at least one memory coupled to the at least one processor and having instructions stored thereon, and when executed by the at least one processor, functioning as:
a management unit configured to store, in a predetermined storage area, management information in which a geographic area corresponding to a message and an identifier corresponding to the messages are associated with one another, the management information being stored for a plurality of the identifiers;
a receiving unit configured to receive position information from an external device;
a selecting unit configured to select an identifier from among the plurality of identifiers based on the position information received by the receiving unit and the geographic area in the management information;
a notifying unit configured to notify the external device of the identifier selected by the selecting unit;
a registering unit configured to register the external device as a delivery-target device to which a message corresponding to the selected identifier is to be delivered;
a delivery unit configured to, in a case where the delivery of a message corresponding to the selected identifier is requested, deliver the message to the external device registered as the delivery-target device; and
a cancelling unit configured to cancel, in a case where a cancellation request for cancelling subscription to the selected identifier is received from the external device, registration as the delivery-target device to which a message corresponding to the selected identifier is to be delivered.

2. The information processing apparatus according to claim 1, wherein
the registering unit registers, in a case where a subscribe request including an identifier is received from the external device, the external device as the delivery-target device to which a message corresponding to the selected identifier is to be delivered.

3. A delivery system in which an information processing apparatus and a communication apparatus are connected with one another via wireless communication, the information processing apparatus comprising:
at least one processor; and
at least one memory coupled to the at least one processor and having instructions stored thereon, and when executed by the at least one processor, functioning as:
a management unit configured to store, in a predetermined storage area, management information in which a geographic area corresponding to a message and an identifier corresponding to the message are associated with one another, the management information being stored for a plurality of the identifiers;
an obtaining unit configured to obtain position information from the communication apparatus;
a selecting unit configured to select an identifier from among the plurality of identifiers based on the position information obtained by the obtaining unit and the geographic area stored as the management information;

a registering unit configured to register the communication apparatus as a delivery-target device to which a message corresponding to the identifier selected by the selecting unit is to be delivered;

a delivery unit configured to, in a case where the delivery of a message corresponding to the selected identifier is requested, deliver the message corresponding to the selected identifier; and a cancelling unit configured to cancel, in a case where a cancellation request for cancelling subscription to the selected identifier is received from an external device, registration as the delivery-target device to which a message corresponding to the selected identifier is to be delivered.

* * * * *